July 18, 1933.  M. LIPPENS  1,918,921

FRUIT JAR SEALER

Filed Nov. 17, 1932   2 Sheets-Sheet 1

Inventor

M. Lippens

By Clarence A. O'Brien
Attorney

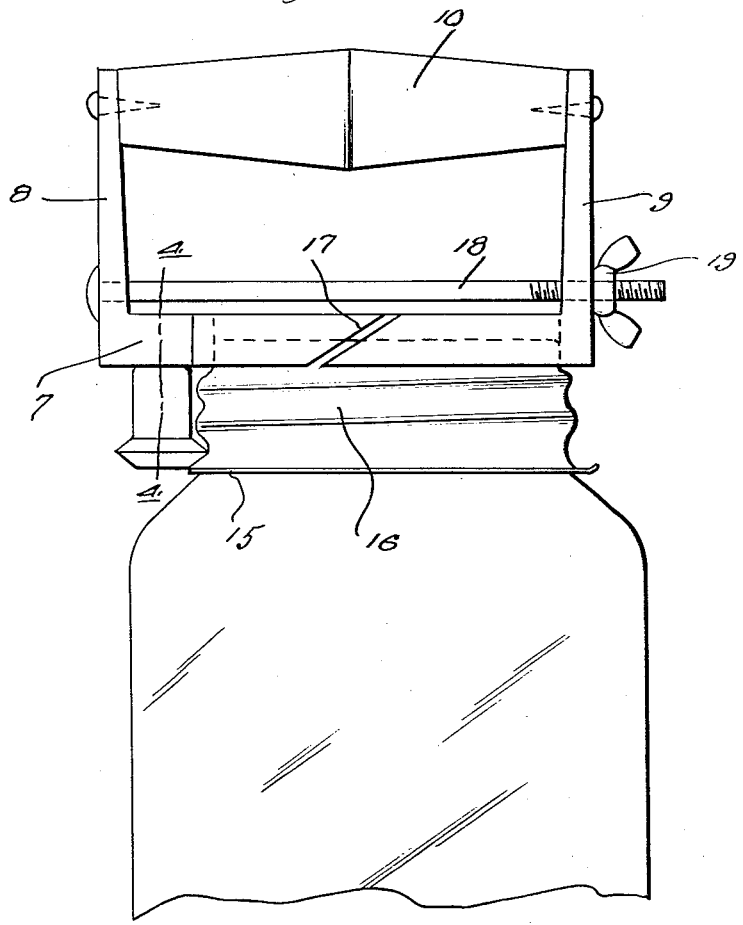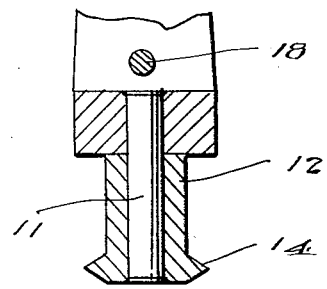

Patented July 18, 1933

1,918,921

UNITED STATES PATENT OFFICE

MAURICE LIPPENS, OF KEWANEE, ILLINOIS

FRUIT JAR SEALER

Application filed November 17, 1932. Serial No. 643,106.

The present invention relates to the impervious sealing of glass jars and canned fruit and the like as is commonly done by housewives, and more particularly to the securing of an impervious joint between the metal cover and the glass body of the jar. In glass jars or cans of this sort, such as the well known Mason fruit jar, the metal cover has a narrow flange or skirt at its edge which is adapted to seat upon a rubber gasket placed between said cover and the body of the jar. It will be understood that said skirt or flange of the cover sometimes gets bent or dented, so that no amount of screwing down upon the rubber rings will make a tight joint where said dent occurs.

Furthermore, the jars being made rapidly and cheaply are not sure to have a perfectly formed seat for the rubber gasket, and there is apt to be enough looseness or lack of depression between said seat and the cover at some point to cause leakage.

The prime objects of the present invention are to provide a convenient implement for pressing or sealing the flange of a fruit jar cover smoothly and tightly down upon its rubber ring beneath.

Another important object of the invention is to provide an implement of this nature which is simple in its construction, inexpensive to manufacture, thoroughly effective and reliable in use, durable, easy to manipulate, and adapted to enable every jar filled with fruit to be perfectly sealed and avoid the danger of loss by leakage and to thus facilitate the canning of fruit and obtain other advantages and results brought out in the following description.

In the drawings:

Figure 3 is another side elevation thereof taken at right angles to that shown in Figure 2 and also showing the same on a fruit jar cap, and Figure 4 is a detail section taken substantially on the line 4—4 of Figure 3.

Figure 1:
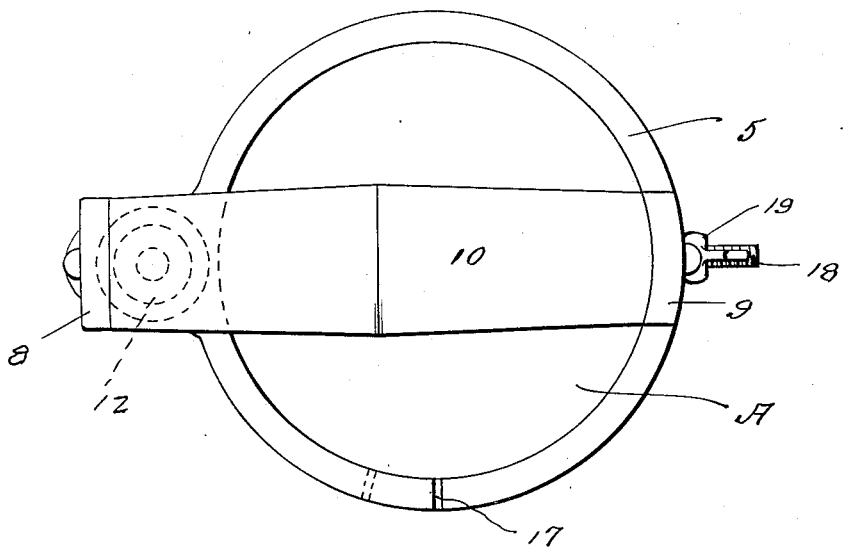
Figure 1 is a top plan view of the implement embodying the features of my invention.
Figure 2:
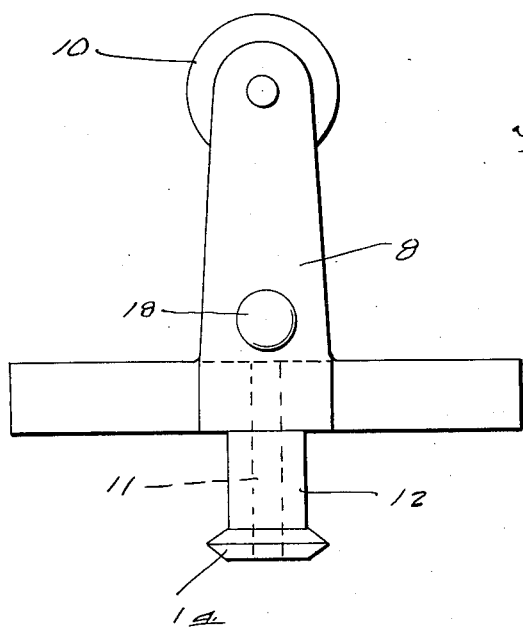
Figure 2 is a side elevation thereof.

Referring to the drawings in detail it will be seen that letter A denotes generally my sealer device which comprises a ring-shaped body member 5 and formed integrally with the body member is the radial extension or lug 7. A leg 8 rises from the extremity of the lug 7 and a similar leg 9 rises from the ring 5 diametrically opposite to the leg 8 to be in coextensive parallel relation therewith and between the extremities of these legs 8 and 9 is fixed in any suitable manner a handle 10. A pin 11 is secured in the lug or extension 7 and depends downwardly therefrom and has journalled thereon a roller 12 at the bottom end of which is formed an annular outwardly directed beveled flange 14 which is adapted to engage with the bottom flange or skirt 15 of a conventional cap 16 for pressing this flange or skirt down tightly against the rubber gasket or the like thereunder and thereby firmly and tightly seal the jar after the cap has been placed thereon.

It will be readily understood that in using this device the ring 5 rotates about the upper portion of the cap as is clearly indicated in Figure 3 thereby allowing the flange of the roller to roll about this skirt or flange 15 and properly shape it and press it against the gasket.

In order to adapt the device to caps of any size within reason, the ring like body 5 is split as at 17, and to contract the body about the cap, there is provided a bolt 18 that extends through suitable apertures provided in the legs 8 and 9, and a wing nut 19 is threadedly engaged with the bolt 18 as shown in the drawings.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A sealing implement of the class described including a ring-shaped body member, a handle structure above said body member and attached thereto, a radial extension on said body member, a pin depending therefrom, a roller journalled on the pin and having an annular beveled flange at the bottom end thereof for engagement with the lower skirt or flange of a cap.

2. A sealing implement of the class described including a ring-shaped body member, a handle structure above said body member and attached thereto, a radial extension on said body member, a pin depending therefrom, a roller journalled on the pin and having an annular beveled flange at the bottom end thereof for engagement with the lower skirt or flange of a cap, said ring-shaped body member being split, and said handle structure including a pair of diametrically opposite legs rising vertically from said body member, and a bolt extending through the legs having a nut threadedly engaged with one end thereof for contracting said ring-shaped body member.

MAURICE LIPPENS.